UNITED STATES PATENT OFFICE.

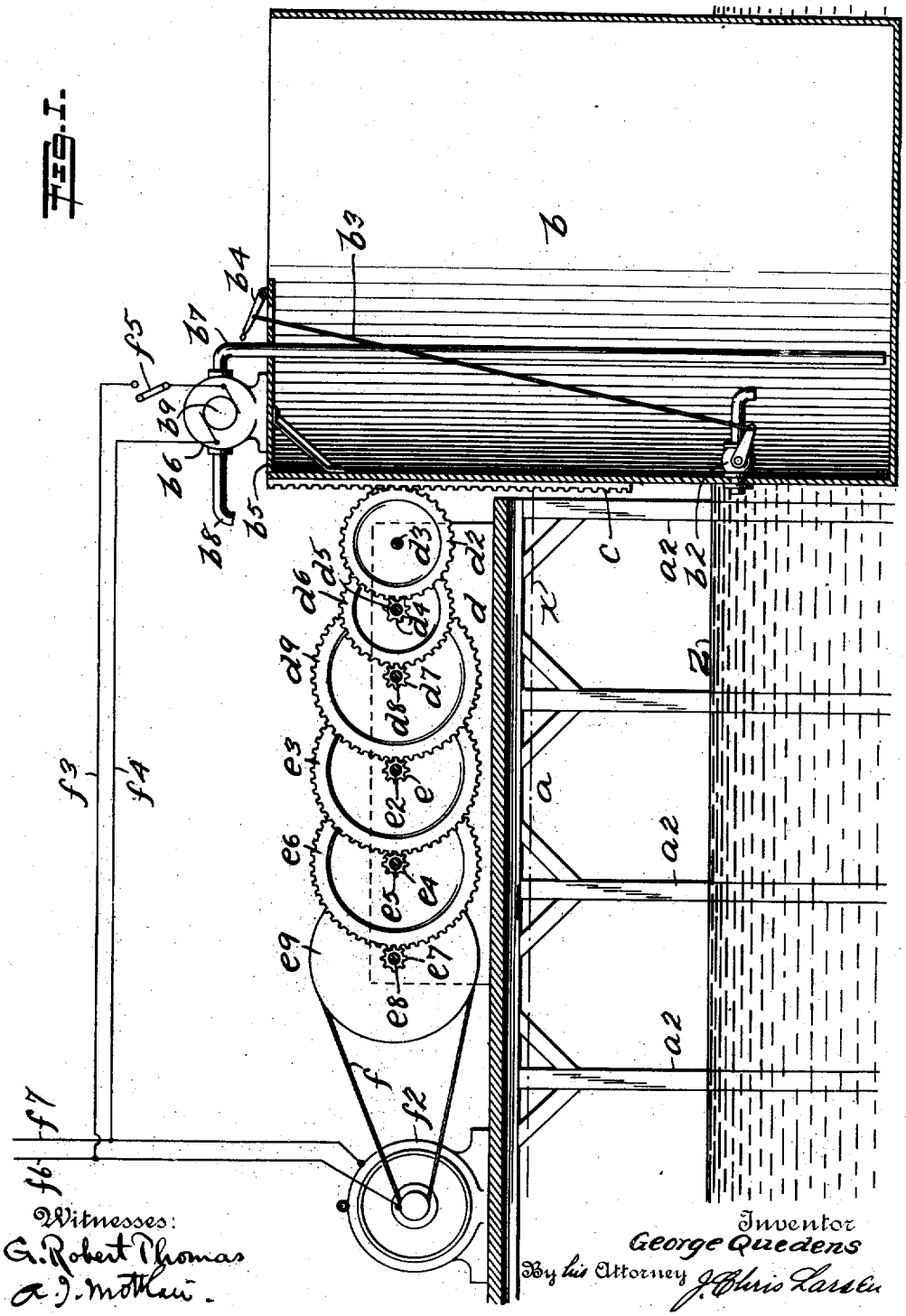

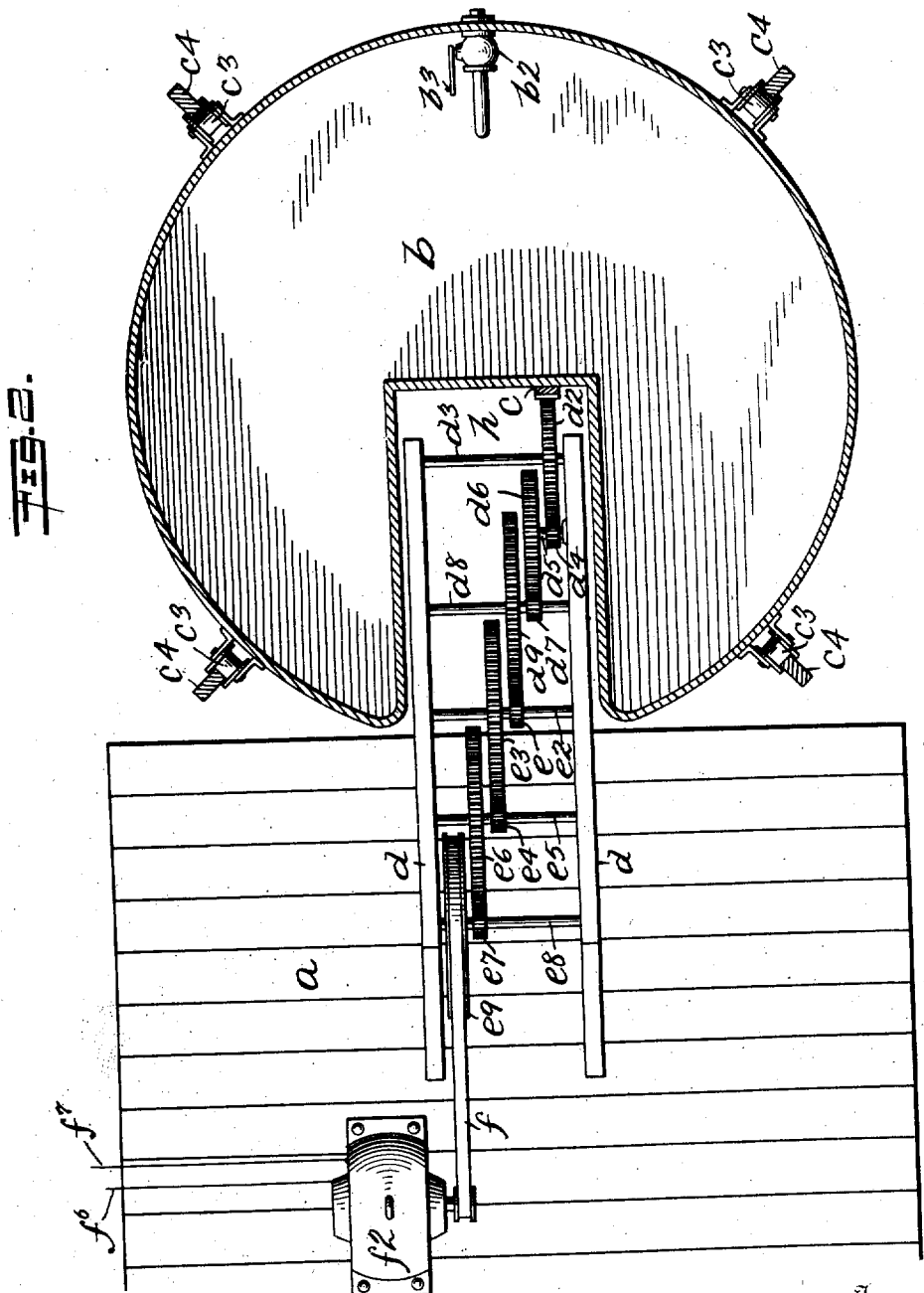

GEORGE QUEDENS, OF NEW YORK, N. Y.

TIDE-MOTOR.

975,157.

Specification of Letters Patent.

Patented Nov. 8, 1910.

Application filed September 29, 1909. Serial No. 520,119.

*To all whom it may concern:*

Be it known that I, GEORGE QUEDENS, a citizen of the United States of America, and residing at New York, in the county of New York and State of New York, have invented certain new and useful Improvements in Tide-Motors, of which the following is a specification, such as will enable those skilled in the art to which it appertains to make and use the same.

This invention relates to apparatus for utilizing the movement of tide water, and the object thereof is to provide means for utilizing said movement, either in the ebb or flow thereof, to develop power for mechanical or commercial purposes.

A further object is to connect the said power means with electrical generators, whereby the power developed by my invention may be carried to and utilized at any distance from tide water, for heat, light, power, or other desired purposes; a further object being to provide means for continuing the operation of my invention during the lull at high tide, between the end of the flood and beginning of the ebb tides; a further object being to provide means for continuing the operation of my invention during the lull at low tide, between the end of the ebb and beginning of the flood tides; a further object being to provide means operable by the electrical energy developed by my invention for accomplishing the last named result; a further object being to so construct my invention whereby the power exerted by the tides shall be at the point of greatest efficiency in the device; and a still further object being to provide such a device which is simple in construction, requires little if any attention and is, therefore, practically automatic, which is positive and practical, and which is comparatively inexpensive.

My invention is fully described in the following specification, of which the accompanying drawings form a part, in which the separate parts are designated by the same reference characters in each of the views, and in which:—

Figure 1 is a sectional elevation of a tide motor constructed according to one form of embodiment of my invention; and Fig. 2 is a sectional plan view thereof, and showing a modification thereof.

In the drawings forming a part of this application I have shown a pier $a$ supported at a desired distance, preferably, above extreme high water by means of piles $a^2$, said high water being indicated at $x$ and low water at $z$.

Closely adjacent the pier, and supported by the water, is a tank $b$ closed at the bottom and composed of material of a suitable weight for the operation of my device but of less specific gravity than the water, said tank being adapted to be partially filled with water, to increase the weight thereof, by means of a valve $b^2$ actuated by a rod $b^3$ operated by a lever $b^4$ on a platform $b^5$, or suitable equivalents, said platform also carrying a pump $b^6$, preferably of the rotary type, having an intake pipe $b^7$ and an outlet pipe $b^8$, the former of which extends to the bottom of the tank and the latter of which may be extended to any suitable point for discharge from the pump, and said pump is preferably operated by means of an electrical motor $b^9$. The tank $b$ carries a vertical rack $c$ of a length sufficiently great for any possible tide movement plus the degree of tank movement due to increasing or decreasing the weight thereof by the admission thereinto or pumping water therefrom, the tank being guided in its movement by rollers $c^3$ moving over fixed uprights $c^4$.

Mounted in a frame $d$ are a plurality of gears and pinions, the outermost of which, $d^2$ on a shaft $d^3$, is enmeshed with the rack $c$ and whereby it may be rotated in the tank movement, said gear $d^2$ engaging a pinion $d^4$ on a shaft $d^5$ carrying a gear $d^6$ engaging a pinion $d^7$ on a shaft $d^8$ carrying a gear $d^9$ in turn connected with a pinion $e$ on a shaft $e^2$ carrying a gear $e^3$ enmeshed with a pinion $e^4$ on a shaft $e^5$ carrying a gear $e^6$ which is engaged by a pinion $e^7$ on a shaft $e^8$ also carrying a pulley, or equivalent, $e^9$. The pulley $e^9$ is connected, by means of a belt $f$ with an electrical generator $f^2$ to which are connected wires $f^3$ and $f^4$, leading to the motor $b^9$ of the pump $b^6$, provided with a switch $f^5$, and said generator is also provided with wires $f^6$ and $f^7$ leading to a distant point of energy utilization.

My tank may be made cylindrical and provided with the rack on the periphery thereof, or it may be made in any other desired form, and, as shown in Fig. 2, I may also mount the rack in a recess $h$ whereby the power resulting from the tank movement is at the point of greatest and balanced efficiency, thus avoiding any friction on the uprights $c^4$.

Normally, the tide water movement, in either direction, moves the tank correspondingly and the pulley and generator are operated thereby through the gears and pinions at a speed and with a power dependent upon the number of gears and pinions employed, and their relative sizes. When the tide is about at its greatest height, the valve $b^2$ is opened and the water slowly entering the tank drives the same downwardly and the gears are actuated in reverse direction, at which time the belt $f$ may be reversed or another generator properly geared for this direction of tank movement may be thrown into action and the other thrown out, thus continuing generation without interruption. When the tide is about slack, the water in the tank will be pumped out until the weight decreases sufficiently for the tank to rise because of its specific gravity, and the gears are again actuated reversely, this movement being taken advantage of as described with reference to the high water position, or in any other desired manner whereby no cessation of generation results during the lulls between tide movements. It will therefore be seen that I secure a practically constant operation of my device, and thus of electrical generation, and the electrical energy developed may be utilized at points remote from my generator location; and while I have shown a preferred form of construction, it will be obvious that many changes therein may be made, within the scope of the following claims, and still be within the spirit of my invention without sacrificing the advantages thereof and, if desired, automatic means may be designed for the valve and pump operation whereby the device will need no attention.

It will be understood that my invention may be placed in any position where the tank is in tide water, but preferably where there is little or no necessity for land purchase or rental and where there is the greatest degree of tide movement and the tank will be made of a size and shape to most efficiently adapt it to varying conditions, as will also the number and size of the gears and pinions.

Having fully described my invention, what I claim as new, and desire to secure by Letters Patent, is:—

1. A tide motor, comprising a tank vertically movable by tide water, a train of gears in operative connection therewith, an electrical generator actuated by said gears, and means, operated by said generator, for causing tank movement during the lull between tides, at low water.

2. In a tide motor, a tank provided with a recess in the side thereof and extending to the center thereof, a rack vertically secured to said tank at the inner end of said recess and a train of gears in operative connection with said rack.

3. In a tide motor, a tank provided with a recess in the side and extending to the center thereof, a rack vertically secured at the inner end of said recess, a train of gears in operative connection with said rack, and an electric generator operated by said gears in the tank movement.

In testimony that I claim the foregoing as my invention I have signed my name in presence of the subscribing witnesses this 22d day of September 1909.

GEORGE QUEDENS.

Witnesses:
GEO. PLACE,
J. C. LARSEN.